(No Model.)
R. W. RIESS.
ATTACHMENT FOR BICYCLES.
No. 453,713. Patented June 9, 1891.
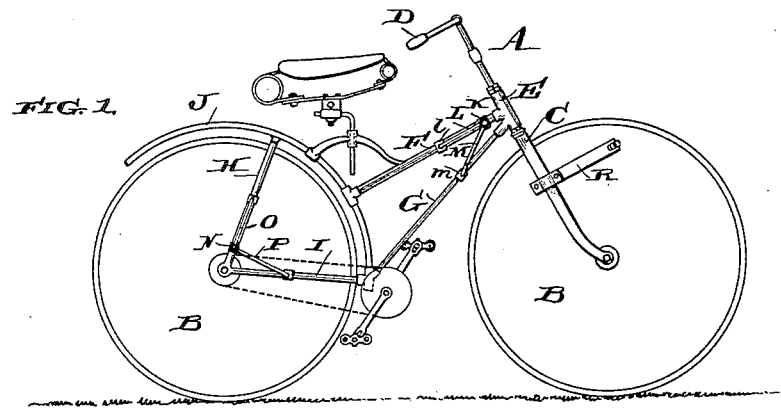
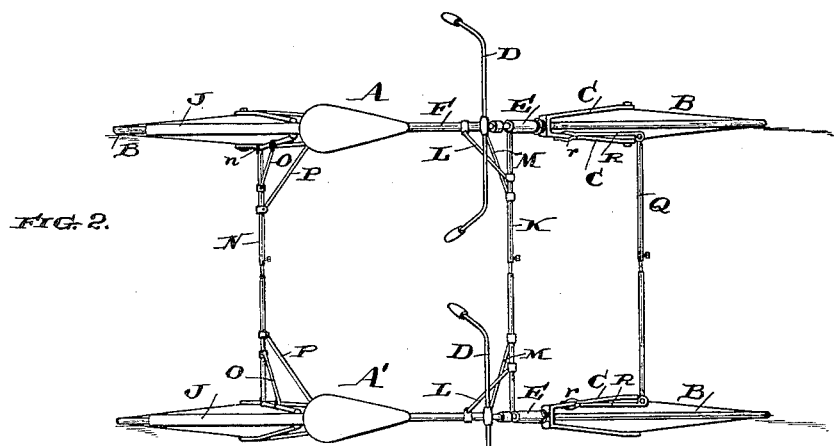
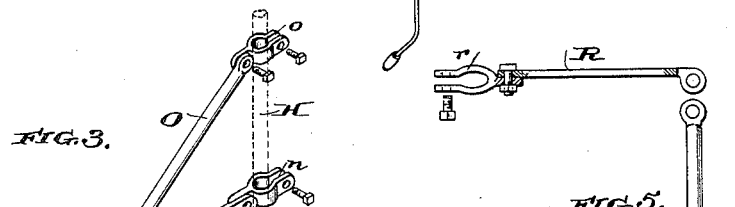
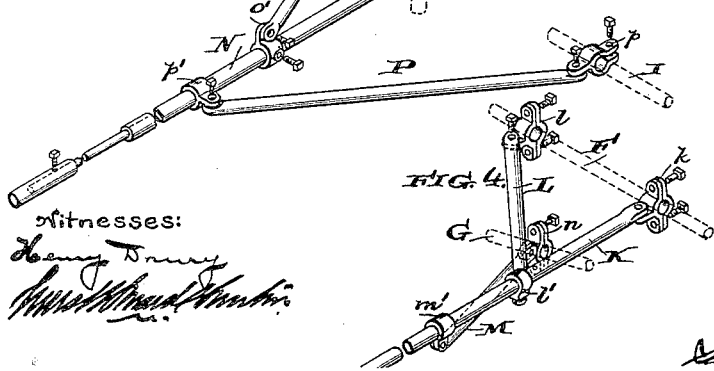
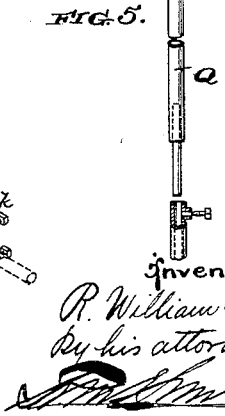
Witnesses:
Inventor:
R. William Riess
By his attorney,
THE NORRIS PETERS CO., PHOTO-LITHO., WASHINGTON, D. C.

UNITED STATES PATENT OFFICE.

RUDOLPH WILLIAM RIESS, OF PHILADELPHIA, PENNSYLVANIA.

ATTACHMENT FOR BICYCLES.

SPECIFICATION forming part of Letters Patent No. 453,713, dated June 9, 1891.

Application filed December 6, 1890. Serial No. 373,759. (No model.)

*To all whom it may concern:*

Be it known that I, RUDOLPH WILLIAM RIESS, of the city and county of Philadelphia, in the State of Pennsylvania, have invented an Improvement in Attachments for Bicycles, of which the following is a specification.

My invention relates to bicycle-attachments; and it consists of certain improvements which are fully set forth in the following specification and shown in the accompanying drawings, which form a part thereof.

The object of my invention is to provide a convenient means of connecting two bicycles together, so that they may move in unison and afford latent support one for the other.

My invention is particularly adapted for the assistance of the beginner who does not possess sufficient skill to manipulate a bicycle alone, and requires assistance to maintain the machine in an upright position. By the assistance thus afforded the beginner is much aided in learning to control a bicycle. It is also a great convenience to expert riders by enabling them to temporarily yoke their machines together, and thus travel side by side and at the same speed, and by rendering riding more easy for the time by relieving them of the care and caution necessary to the operation of the single two-wheeled machine.

The attachment is not adapted only to bicycles of the same size and general construction, but is equally intended and adapted for uniting large and small machines and those of materially-different construction. It may also be made adjustable as to its length, so that the distance between the two machines may be regulated, as desired.

My invention also includes a connection between the steering devices of the two machines, so that they may be steered together, and any operation of the steering-wheel of the one machine will produce a corresponding movement in the other.

My apparatus is of such a character that it may be easily applied or removed, as desired, and renders necessary for its application no change in the construction of the bicycle, being equally adapted to the various well-known machines in use.

My invention also includes certain novel constructions and combinations of parts, all of which are more fully set forth hereinafter and claimed.

In the drawings, Figure 1 is a side elevation of a bicycle having my attachment applied thereto. Fig. 2 is a plan view of two bicycles connected by my improved attachment. Fig. 3 is a perspective view of a portion of the attachment for connecting together the rear portions of the two machines. Fig. 4 is a similar view of a portion of the attachment for the front portion of the machine; and Fig. 5 is a plain view in detail of a portion of the connecting steering devices.

A and A' are respectively two bicycles which are united by my attachment. As heretofore stated, the particular construction of these bicycles is immaterial to my invention, and while two similar bicycles have been shown it will be understood that they may be different one from the other both in construction and size.

B b are the bicycle-wheels.

C is the wheel-fork.

D is the handle-bar.

E is the steering-head. The frame, as shown, is composed of the forward bars F G, connected with the steering-head E, the rear bars H I, and the guard-rod J.

K is the forward connecting-rod, which may be made of one piece or of two pieces sliding one within the other and free to turn one upon the other for adjustment. Carried by the ends of the bar K are clamps $k$, by which the ends of the rod K are clamped upon the forward part of the frame of the machine. In practice I prefer to pivot these clamps $k$ upon the ends of the rod K, as shown, to permit more or less adjustment.

L and M are brace-rods carried by the rod K on each end, and are provided upon their ends with pivoted clamps $l$ and $m$. The rods L and M are preferably pivoted to sliding collars $l'$ and $m'$ upon the rod K, so as to be readily adjustable in every direction. The brace-rods L and M are clamped upon the forward part of the frames of the two machines by their clamps $l$ $m$, and with the rods K firmly unite the two machines at their forward parts, as shown in Fig. 2.

It is immaterial to my invention in what particular manner or to what portions of the frame the respective clamps are connected, as that will depend largely upon the particular construction of the machine to which they are applied. In the drawings the clamps $k$ of the rod K and I of the brace L are connected with the rod F, and the clamp *m* of the brace M with the rod G.

N is the rear connecting-rod, similarly provided on its ends with clamps *n* for attachment with the rear portion of the frames of the machines, which are preferably pivoted for purposes of adjustment.

O and P are braces carried upon each end of the rod N and provided on their ends with clamps *o* and *p*, preferably pivoted. The braces O and P are preferably pivoted to sliding collars *o'* and *p'* upon the rod N for adjustment. The rod N may, if desired, be made in two pieces, one sliding and free to turn upon the other for purposes of adjustment. By this means the rods K and N may be lengthened or shortened, and the two parts may be turned one upon the other to turn the clamps at the two ends at different angles to each other to suit differences in the construction of the machine. The clamps *n*, *o*, and *p* are connected with the rear portions of the machines in any convenient manner, and will firmly unite the rear portions of the machines together.

In the drawings the ends of the rod N and the braces O are shown connected with the rod H and the ends of the braces P with the rods I.

Q is a rod, which may be extensible or adjustable as to its length and laterally in a manner similar to the rods K and N, having pivoted to each end links R, which are provided with clamps *r* for attachment to the inner side of the wheel-forks C of the two machines. By this means the steering devices of the two machines are connected, so that any movement of the one will produce a corresponding movement of the other and the two machines will be steered in unison.

The pivoted connection of the end clamps with the rods and braces and the pivoting of the braces L M and O P with the sliding collars upon the rods K and N permit an adjustment of the rods and braces to any desired position to suit the relative sizes of the bicycles and the particular construction of the machines.

It is apparent that the attachment may be employed to connect a bicycle with a three or four wheeled vehicle, as well as to unite two bicycles.

The clamps upon the ends of the rods and braces permit an easy and quick attachment or disconnection.

In Fig. 2 two machines are shown connected by my apparatus, the rod K and its braces connecting the forward portions of the machines together and the rod N and its braces uniting the rear part, with the rod Q connecting the steering devices.

The minor details of construction which have been shown may be varied without departing from the principles of the invention.

What I claim as new, and desire to obtain by Letters Patent, is—

1. An attachment for connecting wheeled vehicles together, consisting of a transverse rod provided on its ends with clamps for attachment to the frames of the machines and carrying adjacent to each end two arms provided on their ends with clamps for attachment to two different parts of the frame of each machine, whereby connection is made with said rod at three points upon the frame of each machine.

2. An attachment for connecting wheeled vehicles together, consisting of a transverse rod provided on its ends with clamps for attachment to the frames of the machines and carrying adjacent to each end two arms pivoted to said transverse rod, provided on their ends with pivoted clamps for attachment to two different parts of the frame of each machine, whereby connection is made with said rod at three points upon the frame of each machine and said arms and clamps may be adjusted to suit the peculiar construction of each machine independently of the other.

3. A device for detachably connecting wheeled vehicles together, consisting of a rod provided on its ends with clamps for detachable connection with the frames of the machine and having at each end one or more brace pieces or arms connected to said rod by a universal joint and provided upon their ends with a clamping-piece for attachment to the frame of the machine.

4. An attachment for connecting wheeled vehicles together, consisting of a transverse rod provided on its ends with clamps for attachment to the frames of the machines, and with one or more brace-rods also adapted for attachment to the frames of the machines and pivotally connected with said transverse rod.

5. An attachment for detachably connecting two wheeled vehicles together, consisting of an extensible rod provided on its ends with pivoted clamping-pieces adapted for attachment to the frames of the machines, whereby said rod may be extended or shortened to bring the machines to or from each other.

6. An attachment for connecting wheeled vehicles together, consisting of a transverse rod formed in two parts free to turn one upon the other, each of said parts being provided with clamping devices at its end for attachment to the frame of the vehicle, whereby said rods may be adjusted one upon the other.

7. The combination, with two-wheeled vehicles, of a steering-rod connecting the steering devices of the machines together, formed of two parts, each of which may be turned upon its axis independently of the other.

In testimony of which invention I have hereunto set my hand.

R. WILLIAM RIESS.

Witnesses:
S. T. YERKES,
ERNEST HOWARD HUNTER.